US012657539B1

(12) United States Patent
Daniels et al.

(10) Patent No.: US 12,657,539 B1
(45) Date of Patent: Jun. 16, 2026

(54) SUPPLY CHAIN RISK MANAGEMENT

(71) Applicant: Exiger Holdings, Inc., New York, NY (US)

(72) Inventors: Brandon Daniels, Henrico, VA (US); Pavlo Holinko, Barrie (CA); Robert Kerr, Leesburg, VA (US); Alexander Morales, Takoma Park, MD (US); Sylphia Nox, Everett, WA (US); Yang Peng, Aurora (CA); Louis Richer, Toronto (CA)

(73) Assignee: EXIGER HOLDINGS, INC., New York, NY (US)

( * ) Notice: Subject to any disclaimer, the term of this patent is extended or adjusted under 35 U.S.C. 154(b) by 0 days.

(21) Appl. No.: 18/817,766

(22) Filed: Aug. 28, 2024

Related U.S. Application Data

(60) Provisional application No. 63/579,114, filed on Aug. 28, 2023.

(51) Int. Cl.
G06Q 10/0635 (2023.01)

(52) U.S. Cl.
CPC ................................. G06Q 10/0635 (2013.01)

(58) Field of Classification Search
CPC .......................... G06Q 10/063; G06Q 10/0635
See application file for complete search history.

(56) References Cited

U.S. PATENT DOCUMENTS

| | | | |
|---|---|---|---|
| 9,400,826 B2 | 7/2016 | Adamson et al. | |
| 10,678,798 B2 | 6/2020 | Lijachev et al. | |
| 11,934,365 B1* | 3/2024 | Mehta .................. | G06F 16/215 |
| 2002/0107864 A1* | 8/2002 | Battas .................. | G06Q 10/06 |
| 2006/0163338 A1* | 7/2006 | Allen .................. | A01K 11/008 |
| | | | 705/29 |
| 2010/0250603 A1* | 9/2010 | Balakrishnaiah ..... | H04L 9/3234 |
| | | | 707/E17.014 |
| 2020/0327470 A1* | 10/2020 | Trim .................. | G06Q 10/0635 |

OTHER PUBLICATIONS

Y. Wang, H. Li, T. Huang, X. Zhang and Y. Bai, "Scalable Identifier System for Industrial Internet Based on Multi-Identifier Network Architecture," in IEEE Internet of Things Journal, vol. 10, No. 3, pp. 1919-1932, 1 Feb. 1, 2023. (Year: 2023).*

* cited by examiner

*Primary Examiner* — William S Brockington, III
(74) *Attorney, Agent, or Firm* — CANTOR COLBURN LLP

(57) ABSTRACT

Embodiments of the present disclosure may be used to determine risk scores associated with entities in a supply chain. Some embodiments described herein provide unique benefits to alternative implementation approaches including the ability to calculate risk updates using a 'stream' based approach rather than a batch-based approach, thereby enabling updates to be highly parallelized and reducing change to update latency. Some embodiments provide a separation of a result calculation from its use, thereby increasing decoupling and facilitating easy updates, and persistence of results in an intermediate cache thereby reducing read latency and response times when queried. Other embodiments may be disclosed or claimed.

15 Claims, 7 Drawing Sheets

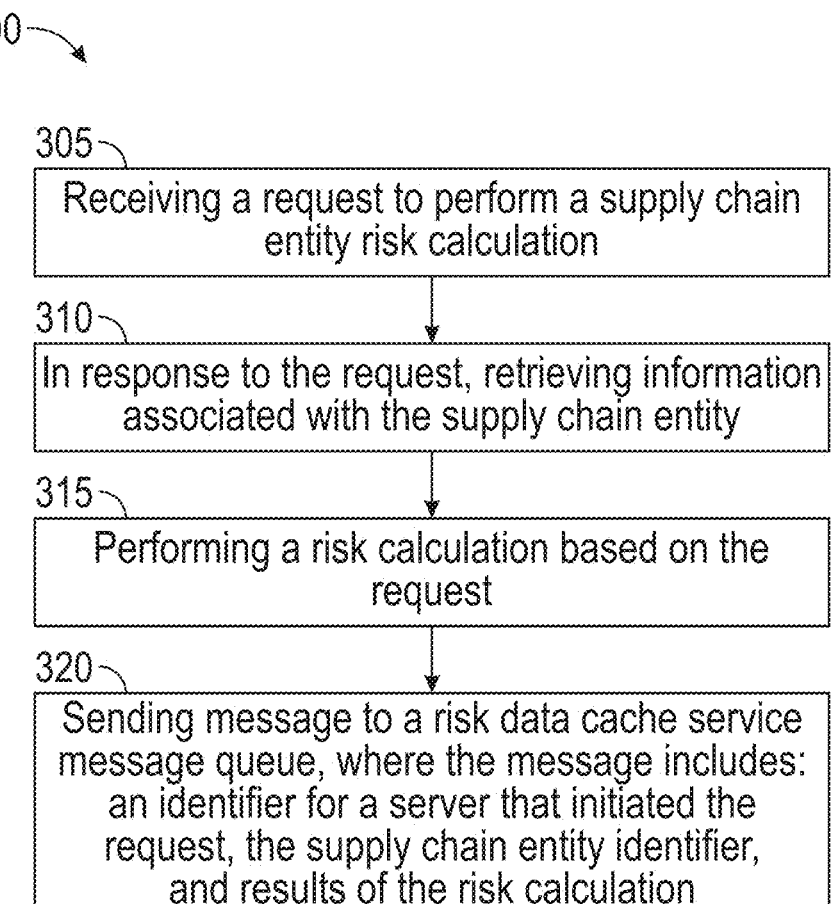

300

305
Receiving a request to perform a supply chain entity risk calculation

310
In response to the request, retrieving information associated with the supply chain entity 315
Performing a risk calculation based on the request 320
Sending message to a risk data cache service message queue, where the message includes: an identifier for a server that initiated the request, the supply chain entity identifier, and results of the risk calculation

FIG. 3

SUPPLY CHAIN RISK MANAGEMENT

CROSS-REFERENCE TO RELATED APPLICATIONS

This application claims the benefit of U.S. Application No. 63/579,114, filed Aug. 28, 2023, the contents of which are incorporated by reference herein in their entirety.

BACKGROUND

A supply chain is a network of businesses, individuals, and activities that are involved in the creation and delivery of a product or service to an end customer. The process typically begins with the procurement of raw materials and ends with the delivery of a final product to the end customer.

A supply chain can have multiple phases. During a planning phase, it is determined what products will be produced, an amount of materials needed, a time frame for production, an approach for the distribution of finished products, and/or the like. During a source phase, raw materials and components are acquired from suppliers/vendors. During a manufacturing phase, the raw materials and components are used to manufacture the final product. After manufacturing, the final product is transported to other locations, such as warehouses or distribution centers during a logistics phase. The final step in the supply chain process is a distribution phase, which involves delivering the finished product to the customer, which can be accomplished using various channels, such as retailers, wholesalers, or direct to the consumer. The logistics phase and the distribution phase can involve various transportation methods, such as truck transport, rail transport, ship transport, and/or the like, including combinations and/or multiples thereof.

Throughout the supply chain process, there is a need for communication and coordination between different parties involved in the supply chain. This includes suppliers, manufacturers, logistics providers, transporters, and retailers.

SUMMARY

Embodiments of the present disclosure may be used to determine risk scores associated with entities in a supply chain. Some embodiments described herein provide unique benefits to alternative implementation approaches including the ability to calculate risk updates using a 'stream' based approach rather than a batch-based approach, thereby enabling updates to be highly parallelized and reducing change to update latency. Some embodiments provide a separation of a result calculation from its use, thereby increasing decoupling and facilitating easy updates, and persistence of results in an intermediate cache thereby reducing read latency and response times when queried.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a flow diagram of a method according to one or more embodiments described herein.

Figure 1:
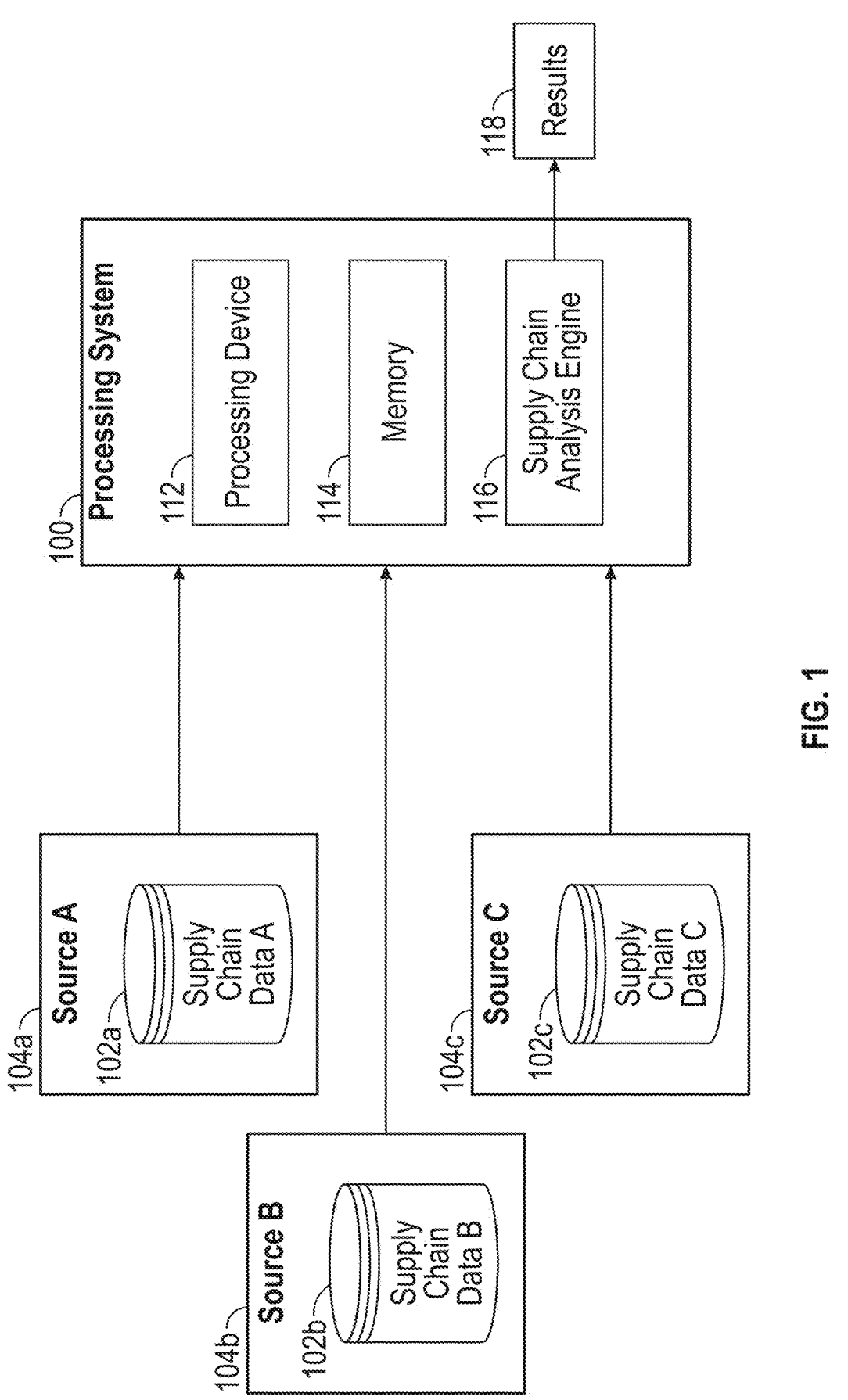
FIG. 1 depicts a block diagram of a processing system for analyzing supply chains according to one or more embodiments described herein.

The diagrams depicted herein are illustrative. There can be many variations to the diagram or the operations described therein without departing from the scope of the embodiments described herein. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments described herein relate to enhancements to risk calculation systems and, more particularly, to creating an 'Auto Risk' capability for an existing risk calculation apparatus. Some embodiments may provide various modifications to a risk calculation software application and elements around it that modify its previous behavior to achieve a continuously updated risk calculation based on changes to the underlying data sources on which the risk score is based.

A supply chain is a network of businesses, individuals, and activities that are involved in the creation and delivery of a product or service to an end customer. The process typically begins with the procurement of raw materials and ends with the delivery of a final product to the end customer.

A supply chain may be susceptible to events that can cause disruptions to the supply chain. For example, supply chains can face cyber threats, financial threats, fraud, and other risks, which may disrupt an organization's business practices. It may be beneficial to analyze data relating to entities that make up a supply chain network for an organization in order to understand and mitigate these risks. Non-limiting examples of risks include one or more of the following: operation risks (e.g., locations and geopolitical risks, labor issue reporting, software integrity); environmental, social, and governance risks (e.g., environmental controversies, non-harmful products and quality products, safe labor practices, modern slavery, compliance with laws and regulations, information security, human rights, business with high-risk countries, supply chain oversight); foreign ownership, control, and influence risks (e.g., state ownership; locations; dominating markets, customers, and suppliers); reputational, criminal, and regulatory risks (e.g., watch-lists, trade restriction lists, criminal records, debarment lists, sanctions lists); and/or the like, including combinations and/or multiples thereof. An organization may interface with many (e.g., 10,000+) third parties in a given year as part of the organization's supply chain network. As such, the amount of third-party data to be analyzed is significant and difficult to analyze. Processing of the data cannot be performed directly by humans, as the underlying data can change faster than a human can process the data. Moreover, supply chains face growing global regulatory compliance issues, such as jurisdictional regulations or laws, which can lead to fines or sanctions for an organization that fails to comply.

Rather than actively monitoring data sources for changes and pulling selected data sets, embodiments as further described herein can perform continuous monitoring with a passive approach. For example, data attributes such as entity-related data, shipping-related data, and risk-related data can exist in multiple data streams with different, asynchronous update rates. According to embodiments, a data structure can be created that automatically generates unique identifiers to link multiple source data sets from the data sources as normalized dynamic data streams. As data feeds from multiple data sources are updated, associations identified with entities can flow through inheritance properties for use such that the latest data updates are already available to report in response to a subsequent user query. This differs from approaches that wait for a user query before searching data sources in an attempt to find matching values each time on demand.

As an example, embodiments can perform data set and logic rebuilds at a regular interval, such as nightly, to ingest large data sets and populate records through passive inheritance relationships such that a fully populated collection of data associated with predefined qualities or attributes is available for immediate use. This can result in an idempotent solution that rapidly returns results in response to subsequent queries to avoid repeated search requests of multiple data sources when the same or similar sets of queries are repeated. Linkage of attributes can include multi-directional pointers to associate data across multiple dimensions. For instance, a data source may identify a location of an entity, such as a company, at a particular geographic location. Another data source may track the movement of goods through a shipping port in close geographic proximity to the company. When a data source indicates a potential issue related to the movement of goods through the shipping port, a shipping risk (e.g., a delay or inability to ship through the port) can be identified for the company even though the data source providing port information did not directly identify the company. Associations can have various levels of confidence depending on whether a direct statement is included in the data or whether the linkage is inferred through one or more pieces of evidence. Furthermore, associations can be defined in a hierarchy across multiple levels of related entities, subsidiaries, and supply chain dependencies.

Systems, such as the processing system 100 of FIG. 1, provide for analyzing supply chains according to one or more embodiments described herein. The processing system 100 receives supply chain data (e.g., supply chain data A 102*a*, supply chain data B 102*b*, supply chain data C 102*c* (collectively referred to as "supply chain data 102")) from multiple sources (e.g., source A 104*a*, source B 104*b*, source C 104*c* (collectively referred to as "sources 104")). The sources 104 can collect and aggregate data about different entities (e.g., suppliers, shippers, vendors, third-parties, and/ or the like, including combinations and/or multiples thereof). Non-limiting examples of the supply chain data 102 can include one or more of the following: federal contracting, purchasing, and spending data; open source data; commerce, shipping, and corporate data; processes data (e.g., resume data, job posting data, social networks, white papers, government documents, investor presentation, news, blogs, and/or the like, including combinations and/or multiples thereof). Thus, the scope of the data extends far beyond direct reporting about entities to include an aggregation of source data from which inferences can be made.

The supply chain data 102 from the different sources 104 can include the same or different types of information, the same or different formats of data, and/or the like, including combinations and/or multiples thereof. For example, the supply chain data A 102*a* can be in a first format and can include a first type of information (e.g., global trade data); the supply chain data B 102*b* can be in a second format and can include a second type of information (e.g., cyber data); and the supply chain data C 102*c* can be in a third format and can include a third type of information (e.g., governmental spending data). The different sources 104 may have different security and access constraints, be located on various servers distributed across multiple geographic locations, and have different update rates.

The processing system 100 analyzes the supply chain data 102 using a supply chain analysis engine 116 to understand and mitigate risks to an organization's supply chain by generating results 118. For example, the processing system 100 can identify supply chain networks, analyze trends, analyze trade relationships, mitigate business risks, assess different types of risks, and/or the like, including combinations and/or multiples thereof. Non-limiting examples of tasks the supply chain analysis engine 116 can perform are as follows: data parsing and cleaning, machine-learned curation, pattern matching, natural language processing, analytics, entity resolution, mashing and integration, and/or the like, including combinations and/or multiples thereof. Other non-limiting examples of tasks the supply chain analysis engine 116 can perform are as follows: product installation confirmation, bill of lading information, product naming normalization, product-to-company-location confirmation, data enrichment, record creation, according to one or more embodiments described herein. The supply chain analysis engine 116 can, alternatively or additionally, assist with quality assurance processing by supporting verifying shipping documents, supporting human resolution of statistically relevant samples, supporting independent phone surveys for verification, and/or the like, including combinations and/or multiples thereof.

The various components, modules, engines, etc. described regarding FIG. 1 (e.g., the supply chain analysis engine 116) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 112 for executing those instructions. Thus, a system memory (e.g., memory 114) can store program instructions that when executed by the processing device 112 implement the engines described herein. Other engines can also be utilized to include other features and functionality described in other examples herein.

In one or more embodiments, the supply chain analysis engine 116 can be implemented on the processing system 100 of FIG. 1. However, in one or more other embodiments, the supply chain analysis engine 116 can be implemented, in whole or in part, using a cloud computing system (not shown). Cloud computing can supplement, support or replace some or all of the functionality of the elements of the processing system 100. Additionally, some or all of the functionality of the elements of the processing system 100 can be implemented as a cloud node of a cloud computing system.

Supply Chain Risk Management

In various embodiments, software applications may be used that automate the collection of data about corporate and personal entities, and assembly of that data into information products that are delivered to customers via Internet-accessible software applications. Embodiments of the present disclosure provide enhanced capabilities for an existing supply chain risk calculation apparatus. Some embodiments may include modifications to a risk calculation software application, and elements around it, that modify its previous behavior to achieve a continuously updated risk calculation based on changes to the underlying data sources on which the risk score is based.

Some exemplary modifications to supply chain risk calculation software may include, but are not limited to:

Enhancement of the existing application to include a message queue based 'listener' interface that listens for changes to the underlying data sources and can trigger updated risk calculations;

Alteration of the existing 'batch' style processing in the application to introduce a 'stream' based flow that allows individual entities to be risk assessed;

Alteration of the persistence scheme for result data to store data in a different structure that supports rapid retrieval; and Creation and provision of a web interface that allows for the retrieval of updated risk scores.

Embodiments of the present disclosure provide a number of advantages over conventional systems. For example, conventional system typically do not include the ability to operate with the same categories of information (i.e. both structured and unstructured data). In the cases where such categories are included, conventional systems do not provide the same level of analytics on the underlying data relative to that provided by embodiments of this disclosure.

The supply chain risk management systems of the present disclosure may also be referred to herein as 'auto risk' systems. Embodiments of the present disclosure may provide unique benefits to alternative implementation approaches including the ability to calculate risk updates using a 'stream' based approach rather than a batch-based approach thereby enabling updates to be highly parallelized and reducing change to update latency, separation of result calculation from its use thereby increasing decoupling and facilitating easy updates, and persistence of results in an intermediate cache thereby reducing read latency and response times when queried.

Additionally, prior implementations of risk calculation systems have relied upon bulk updates and batch-based processing. A typical flow might include a periodic update to an underlying database(s), which is subsequently fed to a job that calculates updated risk for the entire set based on the updates, and finally exposure and use for a given period until the next update.

Embodiments of the present disclosure, by contrast, implement stream based risk processing which enables updates to occur immediately upon update to any data source. Some embodiments may include a message queue-based interface upon which data source changes can be published by any interested party. These updates are then processed by the apparatus to determine if a risk calculation is required and if so, an updated risk score can be calculated. The nature of the risk calculation is such that individual scores are not dependent on others and as such parallelization can be applied to ensure rapid processing independent of other changes to other entities. Via this approach new changes can be streamed into the apparatus as they occur rather than based on an arbitrary batch job time. This approach helps ensure that the time between data source change and updated risk score is minimized, but also eliminates unnecessary calculation based on batch entities that have not changed.

Embodiments of the present disclosure may further provide risk calculations in a separate, decoupled process. This decoupling is implemented on the initiation side via the use of a message queue to ingest change requests, and on the read side via exposure of a web accessible application programming interface (API). Taken together these two interfaces provide a stable point of interaction that other applications can rely upon without specific knowledge of the underlying implementation. This decoupling provides several advantages over more tightly coupled approaches including the ability to easily update the underlying model without changes to any applications that use its results. So long as the defined interfaces do not change (which can be automated via testing), dependent applications do not need to update. An additional benefit of decoupling is the ability to update the apparatus that is used for risk calculations without alteration of the associated dependent tools that rely on the results of the models. Updates to the apparatus to increase parallelism for example could provide enormous reductions in response time with zero changes to applications that depend on the model.

Embodiments of the present disclosure further provide a results cache (the risk service) that stores calculated results from the risk calculation software service (RTIQ). The results cache is implemented to support rapid read response for risk calculations. Risk calculation results may be used in situations where having results available quickly is essential to meet the use requirement. A user interface, for example may need to display the results for a single entity or a group of entities. Rendering the display for users requires that risk calculations be available nearly instantaneously to support the interface's requirements for rapid response.

Some embodiments may create an automatically updated risk calculation for entities based on updates to an underlying data source or application data. Some embodiments may include modifications to risk calculation software and elements that support it to modify its previous behavior to achieve a continuously updated risk calculation.

Figure 2A:
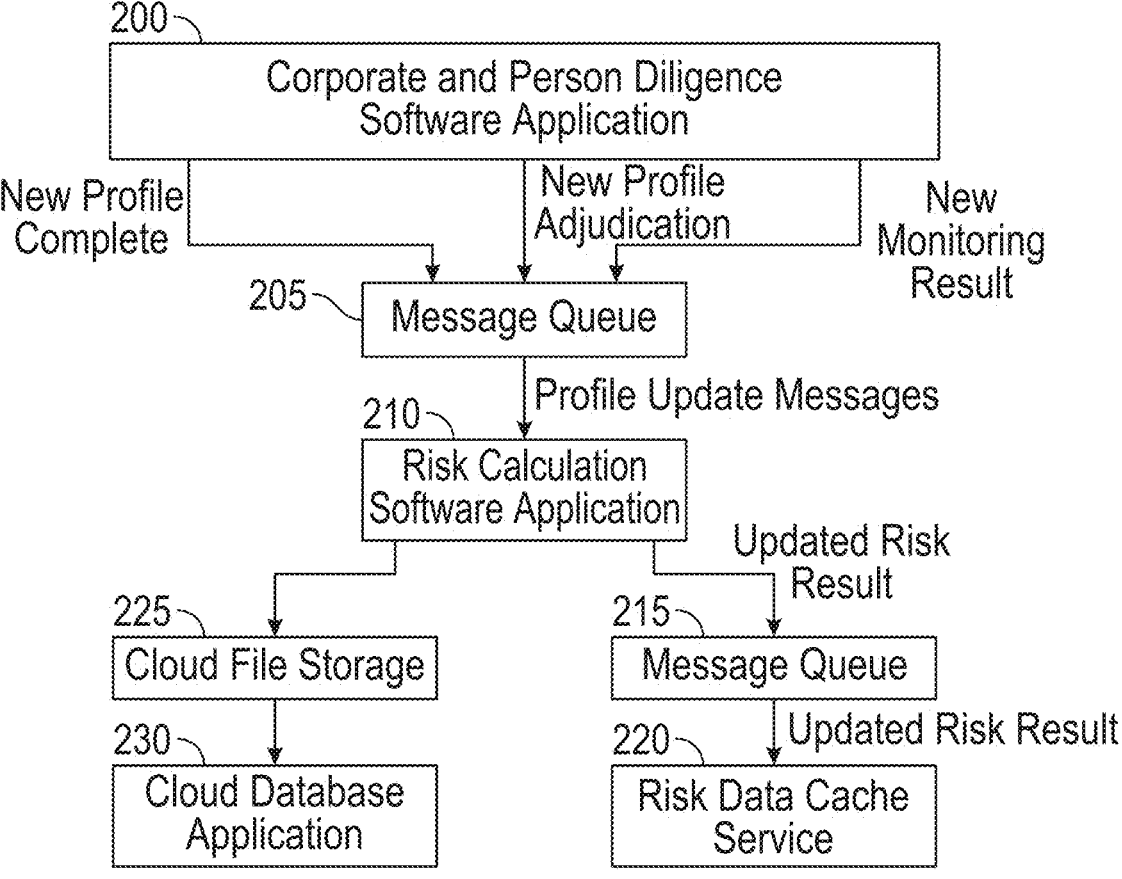
FIG. 2A is a functional block diagram showing an overview of a supply chain risk management system in accordance with various embodiments.

FIG. 2A is a functional block diagram showing an overview of a supply chain risk management system in accordance with various embodiments, which may be performed by any suitable system or combination of systems, such as by supply chain analysis engine 116 show in FIG. 1. A description of the functional blocks in FIG. 2A is as follows:

Corporate and Person Diligence Software Application 200-A software application that provides due diligence information about company and people.

Messages from the Corporate and Person Diligence Software Application-Structured messages from the Corporate and Person Diligence Software Application.

A Message Queue 205—Transfers messages from the Corporate and Person Diligence Software Application to the Risk Calculation Software Application.

Risk Calculation Software Application 210—A software application that performs risk calculations when triggered. This may also be referred to as Risk Calculation Service 210.

A Message Queue 215—Transfers messages from the Risk Calculation Software Application to the Risk Data Cache Service.

Risk Data Cache Service 220—A software application that stores risk results in a rapidly accessible format.

In some embodiments, the Risk Calculation Software Application 210 can interface with other components, such as cloud file storage 225 which may interface with a cloud database application 230.

Figure 2B:
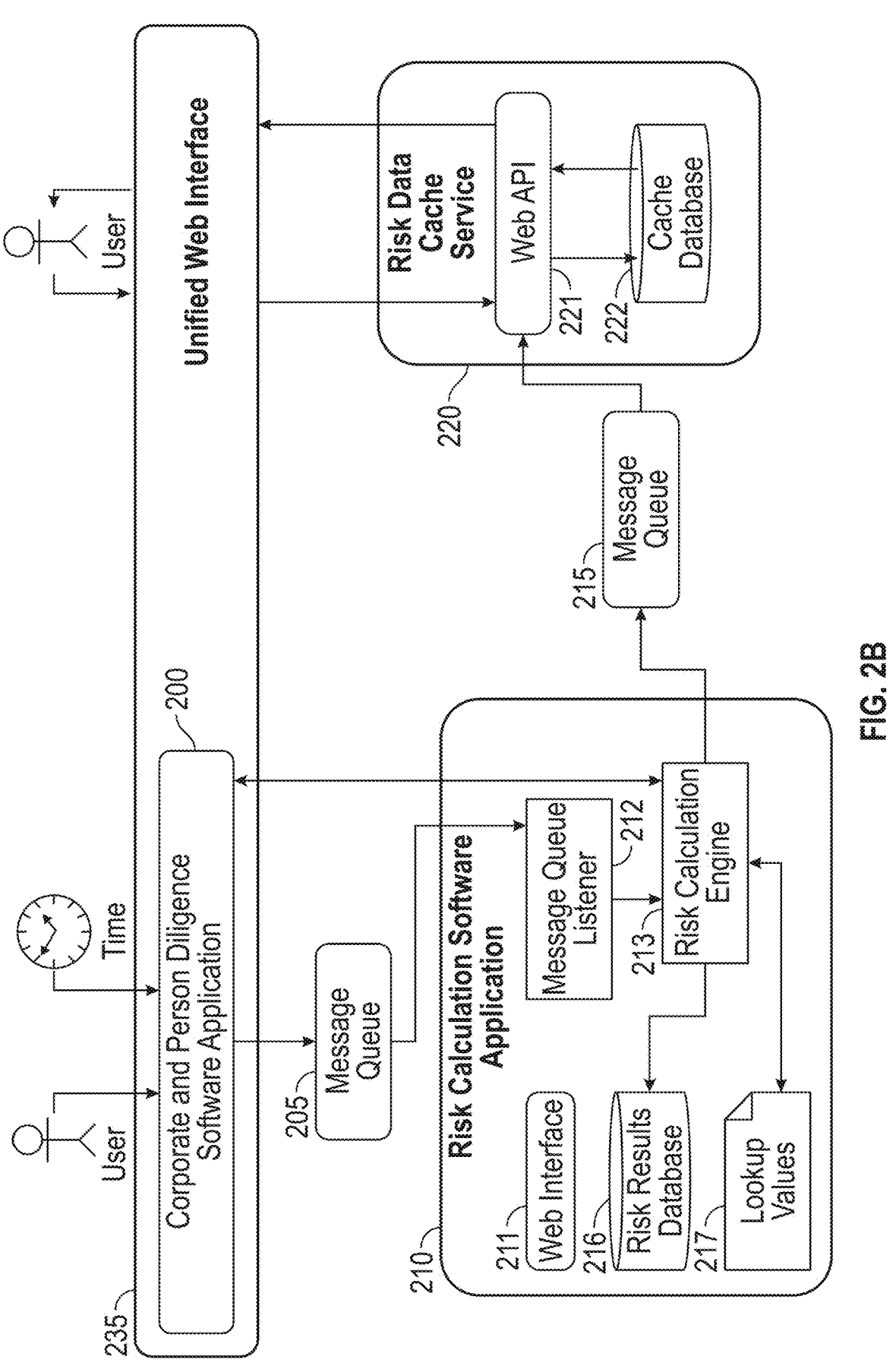
FIG. 2B is another functional block diagram showing a supply chain risk management system in accordance with various embodiments.

FIG. 2B is another functional block diagram showing a supply chain risk management system in accordance with various embodiments. In this example, the components of the system in FIG. 2B are described as follows:

Corporate and Person Diligence Software Application 200—A software application that provides due diligence information about company and people (entities) including information from corporate records registries, structured data sources such as watch lists and entity ownership information, and unstructured data sources such as might be found from internet web searches about the entity or related terms and concepts. This can be accessible by users through a unified web interface 235.

Messages from the Corporate and Person Diligence Software Application—Structured messages from the Corporate and Person Diligence Software Application that indicate when appropriate triggering events occur such as the creation of a new entity, updates to an entity via adjudication, and/or updates to an entity due to periodic monitoring of a given entity.

A Message Queue 205—A form of asynchronous service-to-service communication used in serverless and microservices architectures. Configured in this apparatus to send messages from the Corporate and Person Diligence Software Application 200 to the Risk Calculation Software Application.

Risk Calculation Software Application 210—A software application that gathers information from various sources, assembles the information into a composite representation of an entity, calculates intermediate results, sub-factors, overall factors, risk categories and an overall risk score for an entity, and provides a web accessible interface that allows users to define, initiate, and download the results from risk calculations in a batch style interface. In this apparatus, the configured to enable the calculation of risk automatically when messages arrive from the Corporate and Person Diligence Software Application 200 via the message queue 205. The Risk Calculation Software Application 210 is further comprised of components that include a Web Interface 211, a Message Queue Listener 212, a Risk Calculation Engine 213, and Risk Results Database 216. The Risk Calculation Engine 213 can access and/or update various Lookup Values 217.

Web Interface 211—An application component that provides web interface for users that interact with the Risk Calculation Software Application 210. This interface can be used to prepare, submit, and review the results of risk calculation jobs that provide risk results for batches of profiles.

Message Queue Listener 212—An application component that receives push notifications from the message queue when new messages appear and that takes action based on those messages.

Risk Calculation Engine 213—An application component that performs calculations on entities one by one to complete a risk calculation. Risk calculations integrate data from multiple sources including the Corporate and Person Diligence Software Application, Lookup Values, and other data sources.

Lookup Values 217—An application component comprised of files that contain calculation weights, lists of entities, country names, associations of corporate events to risk categories and scores for same. This component allows for deep configuration of the risk model via configuration files that enable data driven configuration of the risk model calculation. Such changes do not change the mechanism of the apparatus, but that can dramatically change the resultant score.

Risk Results Database 216—An application component that stores the detailed results of risk calculations for review and retrieval as part of risk jobs or auto risk flows.

A Message Queue 215—A form of asynchronous service-to-service communication used in serverless and microservices architectures. Configured in this apparatus to send messages from the Risk Calculation Software Application 210 to the Risk Data Cache Service 220.

Risk Data Cache Service 220—A software application that accepts messages from the Risk Calculation Software Application 210 describing the results of risk calculations, stores results in a rapidly accessible format and the results for consumption via a web application program interface (API).

Web API 221—An application component that provides a web application program interface that enables system to system communication with the Risk Data Cache Service 220.

Cache Database 222—An application component that stores the summarized risk result calculations for use by external services and applications. Data stored in this component is optimized for rapid data retrieval.

Unified Web Interface 235—A software application that provides a unified web application interface to various applications and services. Acts as a single point of entry to the applications implemented in the Risk Calculation Service Auto Risk apparatus.

Figure 2C:
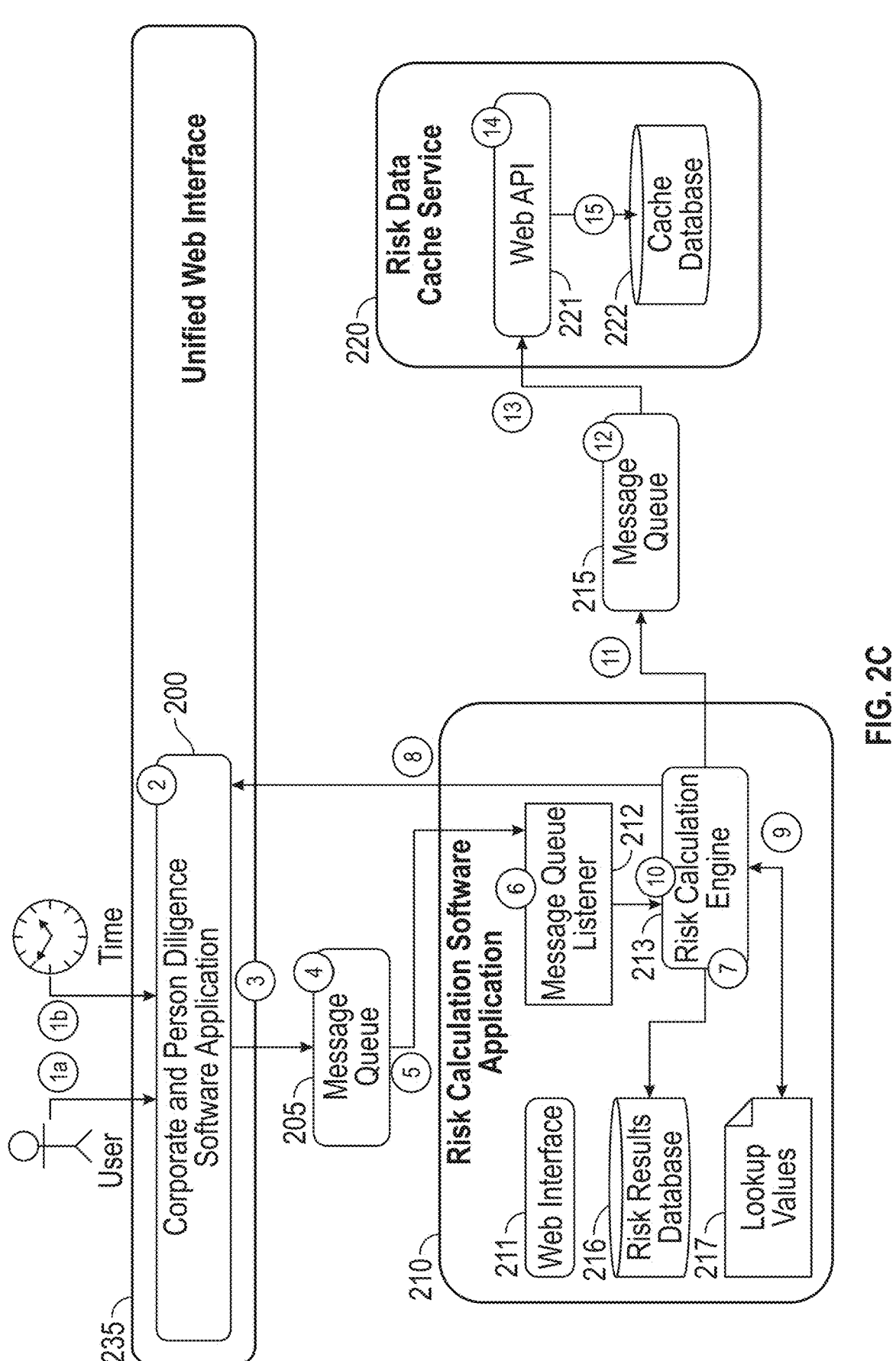
FIG. 2C illustrates an example of a Risk Calculation Service Auto Risk Calculation Flow in accordance with various embodiments.

FIG. 2C illustrates an example of a Risk Calculation Service Auto Risk Calculation Flow in accordance with various embodiments, which may be performed by any suitable system or combination of systems, such as by supply chain analysis engine 116 show in FIG. 1. In the example depicted in FIG. 2C, interaction with the Risk Calculation Service Auto Risk apparatus is initiated in three ways:

By the interaction of users with the Corporate and Person Diligence Software Application 200;

The passage of time, which triggers periodic data collection ('monitoring') by the Corporate and Person Diligence Software Application 200; and By the interaction of users with the Unified Web Interface 235 software application to view risk results.

In some embodiments, interaction with the Risk Calculation Service Auto Risk apparatus can be considered in two data flows—the calculation flow, and the cached data flow. In the example depicted in FIG. 2C, the Auto Risk Calculation Flow is initiated by user interaction with an associated system such as the Corporate and Person Diligence Software Application 200 or via the passage of time and automated initiation of data collection as part of periodic updates for an entity via monitoring. This flow triggers automatic down stream calculations of risk independent of any further user interaction and storage of the results in a cache for ready retrieval.

An exemplary process for a Risk Calculation Service Auto Risk Calculation Flow in accordance with various embodiments may include the following steps:

1. The Risk Calculation Service Auto Risk Calculation Flow is initiated by user interaction with an associated system such as the Corporate and Person Diligence Software Application 200 (Step 1*a*) or via the passage of time and automated initiation of data collection as part of periodic updates for an entity via monitoring (Step 1*b*). User interactions can include creation of a new profile, review, acceptance or comment on profile findings (adjudication).

2. When any of these interactions occur, the Corporate and Person Diligence Software Application 200 performs its existing function to create a profile, capture the adjudication, or monitor the profile over time.

3. Applications that interact with the Risk Calculation Service Auto Risk are modified to send a message (such as a JSON (JavaScript Object Notation) formatted message, which can be a language-independent data format) to a message queue 205 when significant events occur. Messages sent to the message queue 205 can include:

an enumeration of the event type (creation, adjudication, or monitoring),
   an identifier for the server that initiated the request,
   an identifier for the entity (profile identifier), and
   a security token that authorizes access to the identified entity on the named server.

4. The message queue 205 can be configured to route messages from the Corporate and Person Diligence Software Application 200 to the Risk Calculation Service 210 software application. No transformations are applied to the message.

5. The Risk Calculation Service 210 includes a Message Queue Listener 212 component that registers interest in messages to the message queue 205. When the queue receives messages, it can use a push mechanism to trigger the Message Queue Listener 212 service to accept the message and process it.

6. Upon receipt of a message, the Message Queue Listener 212 can initiate a single entity risk calculation processing job with the Risk Calculation Engine 213. The Message Queue Listener 212 can pass the event type, server, entity identifier, and access token into the Risk Calculation Engine 213 for processing.

7. To support the Auto Risk Calculation streaming flow, the Risk Calculation Engine 213 exposes a dedicated interface that allows the initiation of single entity risk calculations. The Risk Calculation Engine 213 can prioritize these calculations over batch jobs. The prioritization mechanism can ensure that auto risk calculations begin and complete before other batch job requests are processed.

8. Using the passed server information, access token and entity identifier, the Risk Calculation Engine 213 can retrieve information about the entity being assessed.

9. The Risk Calculation Engine 213 can retrieve information from lookup values files, assembles them into an assessment request and initiates the risk calculation.

10. The Risk Calculation Engine 213 can perform the risk calculation as normal and stores its result in the full results in the Risk Results Database 216.

11. For Auto Risk calculations, the Risk Calculation Engine 213 can send a JSON formatted message to the Risk Data Cache Service Message Queue (e.g., message queue 215). Messages sent to the message queue 215 can include:

an identifier for the server that initiated the request,
   an identifier for the entity (profile identifier), and
   risk results including the calculation date, final risk score, all category risk scores, and risk drivers information (risk drivers information includes descriptions of the specific unstructured data and watch list data items that drove risk in associated categories).

12. The message queue 215 can be configured to route messages from the Risk Calculation Service 210 software application to the Risk Data Cache Service 220 software application. No transformations may be applied to the message.

13. The Risk Data Cache Service 220 software application includes a configured message queue listener endpoint in its Web API 221 component that registers interest in messages to the message queue. When the queue receives messages, it uses a push mechanism to trigger the Web API 221 listener service to accept the message and process it.

14. The Web API 221 listener can extract the information from the message and stores it in a database (e.g., cache database 222) for future retrieval.

15. The Cache Database 222 component can include a defined schema that captures the entity identifier, calculation date, final risk score, and all category risk scores. The Cache Database 222 can store risk driver information in a separate table in a one-to-many relationship with the main risk table.

Figure 2D:
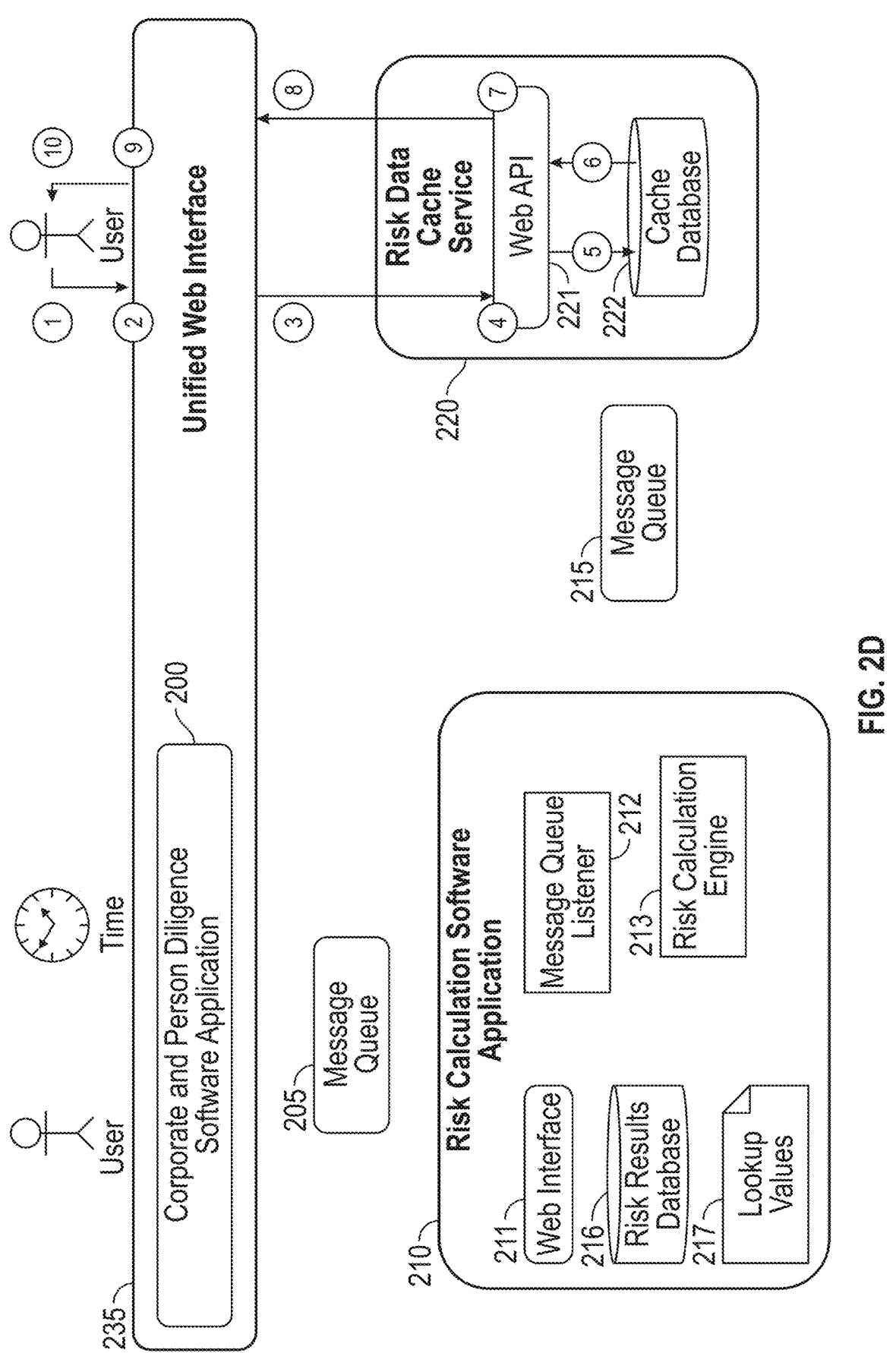
FIG. 2D is a functional block diagram illustrating an example of a Risk Calculation Service Auto Risk Cached Data Flow in accordance with various embodiments.

FIG. 2D is a functional block diagram illustrating an example of a Risk Calculation Service Auto Risk Cached Data Flow in accordance with various embodiments. In this example, the process is initiated by user interaction with a Unified Web Interface 235 application that requires access to risk information. This flow enables the retrieval of cached auto risk calculation information from the Risk Data Cache Service 220 for display in the user application. An exemplary process in accordance with the flow shown in FIG. 2D is as follows:

1. The Risk Calculation Service Auto Risk Cache Flow can be initiated by user interaction with a Unified Web Interface 235 application that requires access to risk information. User interactions include request for the display of any information about an entity that includes risk data. Requests for information are passed for a specific entity indicated by an entity identifier.

2. When a user requests access to risk information, the Unified Web Interface 235 routes portions of the request that require risk data to the Risk Data Cache Service 220 via a synchronous web request passing the entity identifier along with the request. Security is enabled via the passage of a certificate that indicates the service making the request.

3. Requests to the Risk Data Cache Service 220 traverse an internal network not exposed to the public internet.

4. The Risk Data Cache Service 220 exposes a Web API 221 that supports requests for risk information given an entity identifier. Upon receipt of a request, the Web API 221 validates the certificate passed with the request to authorize the requesting service and the identifier to ensure that it is a proper identifier.

5. The Web API 221 passes authorized requests to the Cache Database 222 to retrieve risk information.

6. The Cache Database 222 searches for and retrieves risk information including all or some of the following information:

an identifier for the entity (profile identifier), and risk results including the calculation date, final risk score, all category risk scores, and risk drivers information (risk drivers information includes descriptions of the specific unstructured data and watch list data items that drove risk in associated categories.

7. Upon return of risk data from the Cache Database 222, the Web API 221 component formats the data as a message (e.g., a JSON message) and returns it to the requesting service.

8. Responses from the Risk Data Cache Service 220 traverse an internal network not exposed to the public internet.

9. Upon receipt of risk data from the Risk Data Cache Service 220, the Unified Web Interface 235 reformats the data as necessary for display on the requested view.

10. The requesting user views the requested information.

Exemplary Process

FIG. 3 is a flow diagram of a computer-implemented method 300 according to one or more embodiments described herein. The method 300 can be implemented by any suitable device or system, such as the processing system 100 of FIG. 1 or the processing system 400 of FIG. 4 as a computer-implemented method.

In this example, method 300 may be used to generate and transmit risk calculation information for a supply chain entity as introduced above. In this example, method 300 includes, at 305, receiving a request to perform a supply chain entity risk calculation. Method 300 further includes, at 310, in response to the request, retrieving information associated with the supply chain entity. Method 300 further includes, at 315, performing a risk calculation based on the request. Method 300 further includes, at 320, sending a message (e.g., a JSON-formatted message) to a risk data cache service message queue, where the message includes: an identifier for a server that initiated the request, the supply chain entity identifier, and results of the risk calculation.

In some embodiments, the results of the risk calculation can include one or more of: a risk calculation date, a final risk score, one or more category risk scores, and risk drivers information that includes descriptions of specific unstructured data and watch list data items that drove risk in associated categories.

In some embodiments, the message can be routed from the risk data cache service message queue (e.g., message queue 215) to a risk data cache service 220 software application absent transformations being applied to the message.

In some embodiments, the message can be routed to the risk data cache service via a web API 221 component that registers interest in messages to the risk data cache service message queue.

In some embodiments, the web API 221 can interface with a unified web interface 235 that provides a user interface to control user access to a cache database 222 of the risk data cache service 220, and the web API 221 can control request authorization to retrieve content of the message stored in the cache database 222.

In some embodiments, a message queue listener 212 can monitor for push notifications from a message queue 205 to provide the request to perform the supply chain entity risk calculation to a risk calculation engine 213 that performs the risk calculation.

In some embodiments, the request to perform the supply chain entity risk calculation can be received in response to a periodic data collection trigger associated with a predetermined period of time (e.g., once a day).

In some embodiments, the message can be a language-independent data format message.

In some embodiments, a computer system can include a processor and memory coupled to the processor and storing instructions that, when executed by the processor, cause the computer system to perform a plurality of operations. The operations can include receiving a request to perform a supply chain entity risk calculation, wherein the request includes server information, an access token, and a supply chain entity identifier, in response to the request, retrieving information associated with the supply chain entity, performing a risk calculation based on the request, and sending a message to a risk data cache service message queue, where the message includes: an identifier for a server that initiated the request, the supply chain entity identifier, and results of the risk calculation.

In some embodiments, a computer program product can include a non-transitory computer readable medium storing instructions that, when executed by a computer system, cause the computer system to perform a plurality of operations. The operations can include receiving a request to perform a supply chain entity risk calculation, wherein the request includes server information, an access token, and a supply chain entity identifier, in response to the request, retrieving information associated with the supply chain entity, performing a risk calculation based on the request, and sending a message to a risk data cache service message queue, where the message includes: an identifier for a server that initiated the request, the supply chain entity identifier, and results of the risk calculation.

Technical effects and benefits can include performing computations and updates in a computer system using a 'stream' based approach rather than a batch-based approach, thereby enabling updates to be highly parallelized and reducing change to update latency. Some embodiments provide a separation of a result calculation from its use, thereby increasing decoupling and facilitating easy updates, and persistence of results in an intermediate cache thereby reducing read latency and response times when queried.

Exemplary System

Figure 4:
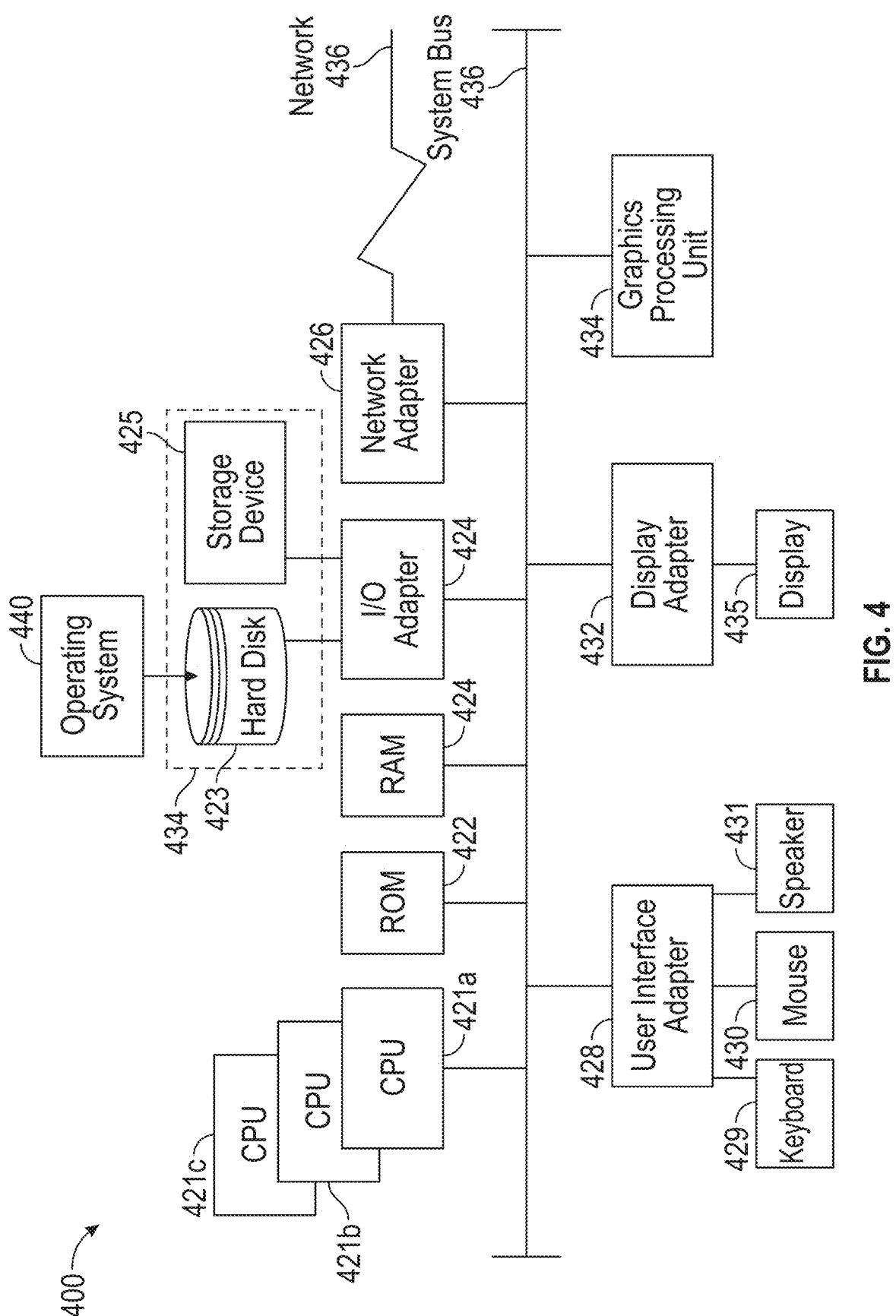
FIG. 4 depicts a block diagram of a processing system for implementing one or more embodiments described herein.

It is understood that one or more embodiments described herein is capable of being implemented in conjunction with any other type of computing environment now known or later developed. For example, FIG. 4 depicts a block diagram of a processing system 400 for implementing the techniques described herein. In some embodiments, processing system 400 has one or more central processing units ("processors" or "processing resources" or "processing devices") 421*a*, 421*b*, 421*c*, etc. (collectively or generically referred to as processor(s) 421 and/or as processing device (s)). In aspects of the present disclosure, each processor 421 can include a reduced instruction set computer (RISC)

microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 424 and a network adapter 426 coupled to system bus 433. I/O adapter 424 may be a small computer system interface (SCSI) adapter that communicates with a hard disk 423 and/or a storage device 425 or any other similar component. I/O adapter 424, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display 435 (e.g., a display monitor) is connected to system bus 433 by display adapter 432, which may include a graphics adapter to improve the performance of graphics intensive applications and a video controller. In one aspect of the present disclosure, adapters 426, 424, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit.

In some aspects of the present disclosure, processing system 400 includes a graphics processing unit 434. Graphics processing unit 434 is a specialized electronic circuit designed to manipulate and alter memory to accelerate the creation of images in a frame buffer intended for output to a display. In general, graphics processing unit 434 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in processing system 400.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

The flowchart and block diagrams in the figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

Examples or claims herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system according to embodiments and examples described.

What is claimed is:

1. A computer-implemented method, comprising:

receiving, by a processing system, a request to perform a supply chain entity risk calculation, wherein the request includes server information, an access token, and a supply chain entity identifier;

in response to the request, retrieving information, by the processing system, associated with the supply chain entity identifier;

performing a risk calculation, by the processing system, based on the request;

sending a message, by the processing system, to a risk data cache service message queue, wherein the message includes: an identifier for a server that initiated the request, the supply chain entity identifier, and results of the risk calculation; and routing the message from the risk data cache service message queue to a risk data cache service absent transformations being applied to the message via a web application programming interface (API) component that registers interest in messages to the risk data cache service message queue, the web API component interfacing with a unified web interface that provides a user interface to control user access to a cache database of the risk data cache service, and controlling request authorization to retrieve content of the message stored in the cache database.

2. The computer-implemented method of claim 1, wherein the results of the risk calculation include one or more of: a risk calculation date, a final risk score, one or more category risk scores, and risk drivers information that includes descriptions of specific unstructured data and watch list data items that drove risk in associated categories.

3. The computer-implemented method of claim 1, further comprising:

monitoring, by a message queue listener, for push notifications from a message queue to provide the request to perform the supply chain entity risk calculation to a risk calculation engine that performs the risk calculation.

4. The computer-implemented method of claim 1, wherein the request to perform the supply chain entity risk calculation is received in response to a periodic data collection trigger associated with a predetermined period of time.

5. The computer-implemented method of claim 1, wherein the message is a language-independent data format message.

6. A computer system comprising:

a processor; and memory coupled to the processor and storing instructions that, when executed by the processor, cause the computer system to perform a plurality of operations comprising:

receiving a request to perform a supply chain entity risk calculation, wherein the request includes server information, an access token, and a supply chain entity identifier;

in response to the request, retrieving information associated with the supply chain entity identifier;

performing a risk calculation based on the request;

sending a message to a risk data cache service message queue, wherein the message includes: an identifier for a server that initiated the request, the supply chain entity identifier, and results of the risk calculation; and routing the message from the risk data cache service message queue to a risk data cache service absent transformations being applied to the message via a web application programming interface (API) component that registers interest in messages to the risk data cache service message queue, wherein the web API component interfaces with a unified web interface that provides a user interface to control user access to a cache database of the risk data cache service, and the web API component controls request authorization to retrieve content of the message stored in the cache database.

7. The computer system of claim 6, wherein the results of the risk calculation include one or more of: a risk calculation date, a final risk score, one or more category risk scores, and risk drivers information that includes descriptions of specific unstructured data and watch list data items that drove risk in associated categories.

8. The computer system of claim 6, wherein a message queue listener monitors for push notifications from a message queue to provide the request to perform the supply chain entity risk calculation to a risk calculation engine that performs the risk calculation.

9. The computer system of claim 6, wherein the request to perform the supply chain entity risk calculation is received in response to a periodic data collection trigger associated with a predetermined period of time.

10. The computer system of claim 6, wherein the message is a language-independent data format message.

11. A computer program product comprising a non-transitory computer readable medium storing instructions that, when executed by a computer system, cause the computer system to perform a plurality of operations comprising:

receiving a request to perform a supply chain entity risk calculation, wherein the request includes server information, an access token, and a supply chain entity identifier;

in response to the request, retrieving information associated with the supply chain entity identifier;

performing a risk calculation based on the request;

sending a message to a risk data cache service message queue, wherein the message includes: an identifier for a server that initiated the request, the supply chain entity identifier, and results of the risk calculation; and routing the message from the risk data cache service message queue to a risk data cache service absent transformations being applied to the message via a web application programming interface (API) component that registers interest in messages to the risk data cache service message queue, wherein the web API component interfaces with a unified web interface that provides a user interface to control user access to a cache database of the risk data cache service, and the web API component controls request authorization to retrieve content of the message stored in the cache database.

12. The computer program product of claim 11, wherein the results of the risk calculation include one or more of: a risk calculation date, a final risk score, one or more category risk scores, and risk drivers information that includes descriptions of specific unstructured data and watch list data items that drove risk in associated categories.

13. The computer program product of claim 11, wherein a message queue listener monitors for push notifications from a message queue to provide the request to perform the supply chain entity risk calculation to a risk calculation engine that performs the risk calculation.

14. The computer program product of claim 11, wherein the request to perform the supply chain entity risk calculation is received in response to a periodic data collection trigger associated with a predetermined period of time.

15. The computer program product of claim 11, wherein the message is a language-independent data format message.

* * * * *